United States Patent
Garnett et al.

(10) Patent No.: US 10,513,340 B2
(45) Date of Patent: Dec. 24, 2019

(54) ROTOR ICE PROTECTION SYSTEMS AND METHODS

(75) Inventors: Harold Edward Garnett, Prior Lake, MN (US); Matthew Michael Webb, Burnsville, MN (US); Jason Lee Skoglund, New Hope, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 2148 days.

(21) Appl. No.: 13/565,155

(22) Filed: Aug. 2, 2012

(65) Prior Publication Data

US 2014/0037446 A1 Feb. 6, 2014

(51) Int. Cl.
*B64D 15/22* (2006.01)
*B64D 15/14* (2006.01)

(52) U.S. Cl.
CPC .......... *B64D 15/22* (2013.01); *B64D 15/14* (2013.01)

(58) Field of Classification Search
CPC ........ B64D 15/22; B64D 15/12; B64D 15/20; B64D 2700/62061
USPC .... 416/1, 31, 36, 37, 39, 61, 95; 244/134 D, 244/134 F; 340/962, 580–583
See application file for complete search history.

(56) References Cited

U.S. PATENT DOCUMENTS

| | | | |
|---|---|---|---|
| 4,036,457 A * | 7/1977 | Volkner | G05D 23/1905 219/202 |
| 5,704,567 A | 1/1998 | Maglieri | |
| 6,129,314 A * | 10/2000 | Giamati | B64D 15/00 244/134 A |
| 6,560,551 B1 * | 5/2003 | Severson | B64D 15/22 340/582 |
| 7,523,889 B2 | 4/2009 | Bourjac et al. | |
| 7,604,202 B2 | 10/2009 | Froman et al. | |
| 7,926,763 B2 | 4/2011 | Froman | |
| 8,779,945 B2 * | 7/2014 | Flemming | G01C 23/005 244/134 F |
| 2002/0158768 A1 * | 10/2002 | Severson | G08B 19/02 340/581 |
| 2006/0226292 A1 | 10/2006 | Houlihan et al. | |

(Continued)

FOREIGN PATENT DOCUMENTS

| | | |
|---|---|---|
| CN | 101176383 A | 5/2008 |
| CN | 101176383 A | 5/2008 |

OTHER PUBLICATIONS

First Office Action dated Apr. 1, 2016 in connection with Application No. CN201310334765.4.

(Continued)

*Primary Examiner* — Christopher Verdier
(74) *Attorney, Agent, or Firm* — Locke Lord LLP; Scott D. Wofsy; Georgi Korobanov

(57) ABSTRACT

A method for managing icing conditions on a rotary aircraft via one or more ice protection controllers. The method includes steps for receiving an icing condition signal from an icing rate sensor at an ice protection controller, determining, in response to the icing condition signal, a de-icing signal based at least in part a liquid water content (LWC). The method further includes steps for transmitting, via a digital communication bus disposed in at least part of a slip ring assembly, the de-icing signal to a upper distributor to cause the upper distributor to transmit power to one or more heating elements for a respective rotor blade.

7 Claims, 4 Drawing Sheets

(56) References Cited

U.S. PATENT DOCUMENTS

| | | | | |
|---|---|---|---|---|
| 2007/0176049 A1* | 8/2007 | Greene | ............... | B64D 15/20 244/134 F |
| 2007/0257153 A1* | 11/2007 | Froman | ............... | B64C 29/0033 244/134 D |
| 2008/0152494 A1* | 6/2008 | Froman | ............... | B64D 15/12 416/95 |
| 2008/0167764 A1* | 7/2008 | Flemming | ............... | B64D 15/20 701/14 |
| 2011/0226904 A1* | 9/2011 | Flemming | ............... | G01C 23/005 244/134 F |

OTHER PUBLICATIONS

State Intellectual Property Office, P.R. China, 2nd Office Action dated Nov. 30, 2016 issued during the prosecution of corresponding Chinese Patent Application No. 201310334765.4 (11 pages).

State Intellectual Property Office of People's Republic China Search Report received Nov. 30, 2016, issued during the prosecution of corresponding Chinese Patent Application No. 201310334765.4 (2 pages).

* cited by examiner

ROTOR ICE PROTECTION SYSTEMS AND METHODS

BACKGROUND OF THE INVENTION

1. Field of the Invention

The present invention relates to ice protection techniques for rotary aircraft, and more particularly to a rotor ice protection system and method using digital icing rate detection.

2. Description of Related Art

Accumulating ice on rotor blades of rotary wing aircrafts is particularly dangerous. For example, ice accumulation on leading edges of the rotor blades causes an increase in drag force, loss of lift, increased stalled speed, and un-stabilized flight. Even a minimal amount of ice on the leading edges can disrupt airflow patterns and can ultimately lead to a crash.

Although conventional ice protection techniques have been developed and deployed on various fixed-wing aircraft for many years, few ice protection systems have been developed for rotary aircraft. Typically, rotary aircraft or helicopters are not equipped with ice protection systems due to additional weight, complexity, cost, etc. Further, the techniques deployed on various fixed-wing aircraft are not suitable for rotary aircraft application (e.g., inflatable boots to break ice formations along a wing).

Although some techniques for ice management have been developed for rotary aircraft, there still remains a continued need in the art for improved techniques for ice management for rotary aircraft while respecting aircraft weight (e.g., minimizing a number of line replaceable units (LRUs) and reducing system complexity. The present invention provides a solution for these problems.

SUMMARY OF THE INVENTION

The purpose and advantages of the present invention will be set forth in and become apparent from the description that follows. Additional advantages of the invention will be realized and attained by the methods and systems particularly pointed out in the written description and claims hereof, as well as from the appended drawings.

To achieve these and other advantages and in accordance with this disclosure, as embodied herein, a method is provided for managing icing conditions on a rotary aircraft via one or more ice protection controllers. The method can include receiving an icing condition signal from an icing rate sensor at an ice protection controller. For example, the icing rate sensor can generate the icing condition signal based on a monitored oscillation frequency of a magnetostrictive oscillator. Moreover, the icing condition signal can be a frequency modulated signal that dynamically reflects the changes in the oscillation frequency over time. In response to the icing condition signal or changes in the de-icing signal, the method provides for generating a de-icing signal based, at least in part on, a liquid water content (LWC). The method further provides transmitting the de-icing signal to an upper distributor via a digital communication bus disposed in at least part of a slip ring assembly. This de-icing signal can cause the upper distributor to transmit power to one or more heating elements of a respective rotor blade. In these embodiments, the LWC can be determined based on a change in frequency of the icing condition signal over time and least one of an airspeed and rotor rotations per minute (RPM) of main rotor blades of the rotary aircraft.

In certain embodiments, the de-icing signal can be a power signal. In such embodiments, the step of transmitting the de-icing signal includes transmitting the de-icing power signal to the one or more heating elements according to a duty cycle to cause the heating elements to de-ice respective rotor blades via iteratively accumulating and melting ice in contact with a leading edge of respective rotor blades. Further, the one or more heating elements can include a plurality of zones for respective rotor blades. In addition to the duty cycle, the de-icing power signal can cause the plurality of zones to activate according to a sequence.

In accordance with certain other embodiments, the method can further include providing an anti-ice signal to tail rotor blades. In these certain other embodiments, the method provides steps for determining an anti-icing signal based at least in part on the liquid water content (LWC), and transmitting the anti-icing signal to one or more tail heating elements of a respective tail rotor blade. Further, the anti-icing signal can cause the one or more tail heating elements to prevent ice formation on the respective tail rotor blade. In addition, the method can further include determining a fault condition based at least in part on passing current through at least one of the tail heating elements and/or one of the main rotor blade heating elements, and transmitting the fault condition to an avionics system of the rotary aircraft. Preferably, the anti-icing signal is determined in the same fashion as the de-icing signal is determined for the main rotor blades (e.g., the LWC).

In accordance with a system embodiment of the disclosure, a rotor ice protection system for a rotary aircraft is provided. For this system, the rotary aircraft includes one or more heating elements associated with a respective rotor blade. The rotor ice protection system includes at least one ice protection controller that receives an icing condition signal and, in response, generates a de-icing signal. The de-icing signal is based at least in part on a liquid water content (LWC). Further, the LWC is determined based at least in part on changes to a frequency of the icing condition signal over time and at least one of an airspeed and rotations per minute (RPM) of main rotor blades, depending on if the aircraft is in a hover. The rotor ice protection system further includes one or more icing rate sensors in communication with the ice protection controller. The icing rate sensors can include sensors such as a magnetostrictive oscillator that detects the icing condition via an oscillation frequency. Each icing rate sensor detects an icing condition and, in response to the detected icing condition, generates the icing condition signal, which is transmitted and received by the ice protection controller. The ice protection controller receives the icing signal, determines the de-icing signal, and transmits the de-icing signal to an upper distributor. The upper distributor is in communication with the ice protection controller via a digital communication bus that is disposed at least in part in a slip ring assembly. The upper distributor receives the de-icing signal from the ice protection controller and in response, transmits power to the one or more heating element to de-ice the respective rotor blade. In these embodiments, the icing condition signal can be a frequency modulated signal that dynamically reflects changes in the oscillation frequency over time. Accordingly, the ice protection controller can generate the de-icing signal in response to the changes in the oscillation frequency over time. As with the method for managing icing conditions on a rotary aircraft, the upper distributor of the rotor ice protection system can transmit power according to schedule (e.g., a duty cycle, zone activation, etc.) that causes the one or more heating elements to de-ice each respective rotor blade by iteratively accumulating and melting ice in contact with a leading edge of the respective rotor blade. Moreover, the heating elements can include a plurality of zones which can be activated in a sequence.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
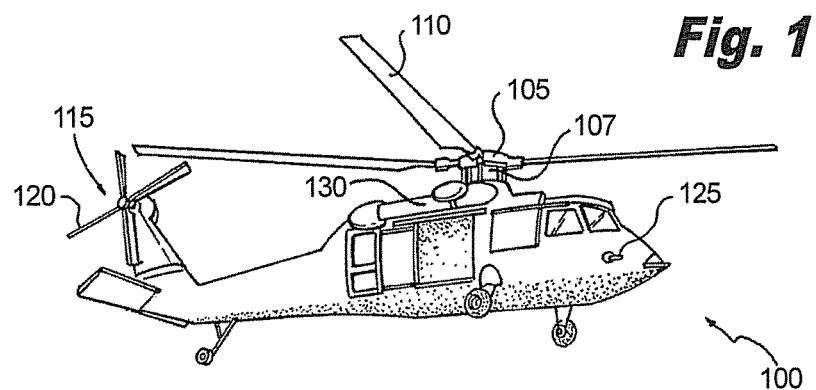
FIG. 1 is a perspective view of a rotary aircraft having an ice management system in accordance with the present invention.

Reference will now be made to the drawings wherein like reference numerals identify similar structural features or aspects of the subject invention. For purposes of explanation and illustration, and not limitation, a perspective view of a rotary aircraft having an ice management system in accordance with the invention is shown in FIG. 1 and is designated generally by reference character 100. Specific components of the ice management system deployed in rotary aircraft 100 are provided in FIGS. 2-5, as will be described herein. The devices and methods of the invention can be used in rotary aircraft, including single and dual main rotor shaft aircraft configurations.

As shown in FIG. 1, an example rotary aircraft, helicopter 100, includes an ice management system. Helicopter 100 includes a main rotor 105, including a main rotor slip ring 107 and plurality of main rotor blades 110, and a tail rotor 115, including a plurality of tail rotor blades 120. As shown, helicopter 100 further includes an ice rate sensor 125. In operation, helicopter 100 is powered by one or more engines (e.g., engine 130), which provides power to main rotor 105 and tail rotor 115 via an aircraft transmission system (not shown) causing main rotor blades 110 and tail rotor blades 120 to rotate. Notably, while helicopter 100 is shown in a particular configuration in the FIGS, it should be understood that the ice management techniques disclosed herein may be used on any type of rotary aircraft, including dual rotor shaft aircraft, tilt-rotor aircraft, etc.

Figure 2:
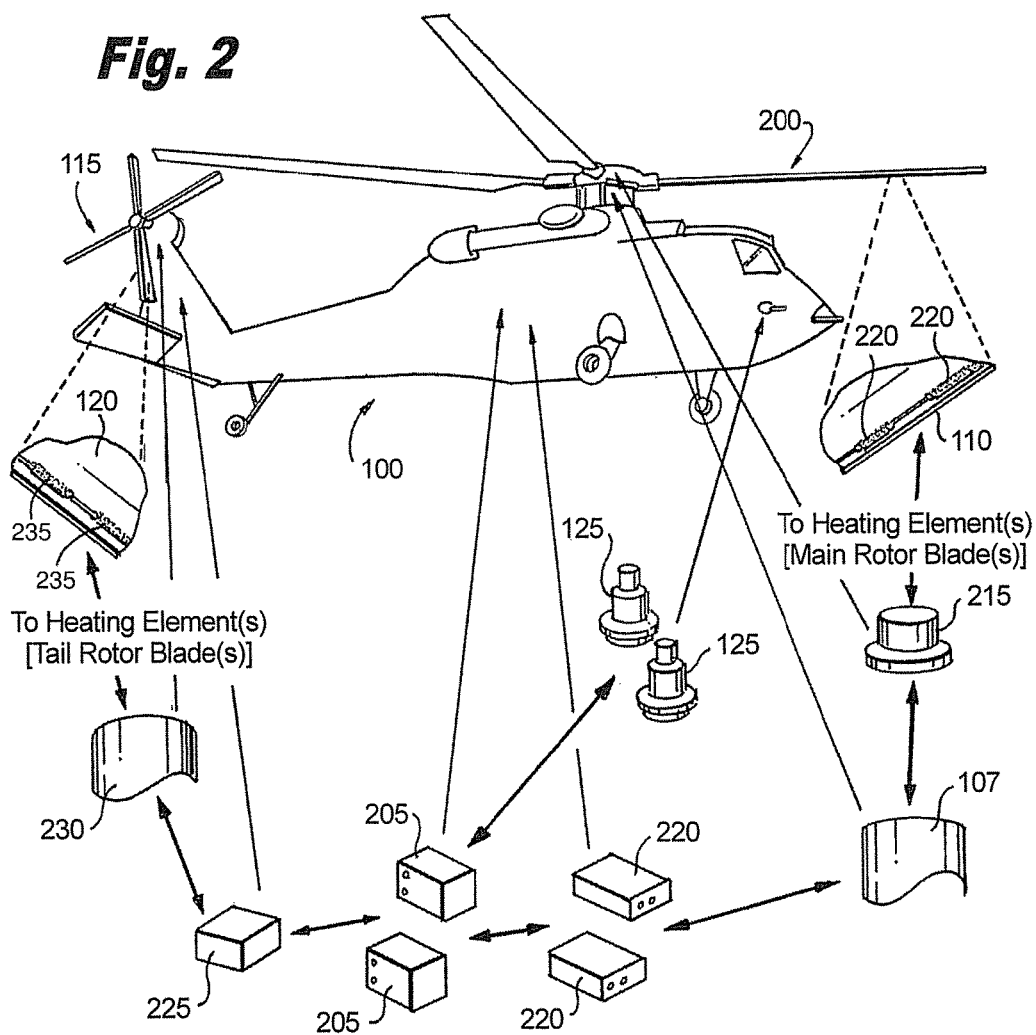
FIG. 2 is a schematic view of various components of an ice management system of the present invention.

Referring now to FIG. 2, various components of an ice protection system (e.g., ice protection system 200), which has been constructed in accordance with an embodiment of the present invention, are shown. Notably, in preferred embodiments, redundant components are provided so as to avoid potential fault conditions and increase aircraft safety. Ice protection system 200 includes one or more main ice protection controllers 205 in communication with one or more power converter cutout units 210 (shown in FIG. 4). Each power converter unit 210 further communicates, via a digital communication bus that passes through slip ring 107, with an upper distributor 215. Upper distributor 215 further communicates with one or more heating elements 220 for a respective rotor blade. Each main rotor blade heating element can include multiple zones, e.g., typically five or six zones. In some embodiments, a single heating zone is energized or provided power at a time. In operation, during a de-ice cycle, the main ice protection controller 205 commands the upper distributor 215 to energize each heating zone in a sequence. For example the sequence can includes activating zones from a leading edge of a respective rotor blade. The amount of time each heating zone is energized is determined by a heating algorithm based at least in part on an outside air temperature (OAT), a liquid water content (LWC), airspeed, and/or a main rotor rotations per minute (RPM).

Still referring to FIG. 2, each ice protection controller 205 further communicates with a tail lighting box 225. Tail lighting box 225 communicates, via tail-slip ring 230 with one or more heating elements 235 associated with a respective tail rotor blade. FIG. 2 illustrates communication amongst the various components as well as a general placement within and around helicopter 100. This placement is shown for purposes of illustration and not limitation as placement can vary amongst helicopter configurations as understood by those skilled in the art.

Figure 3:
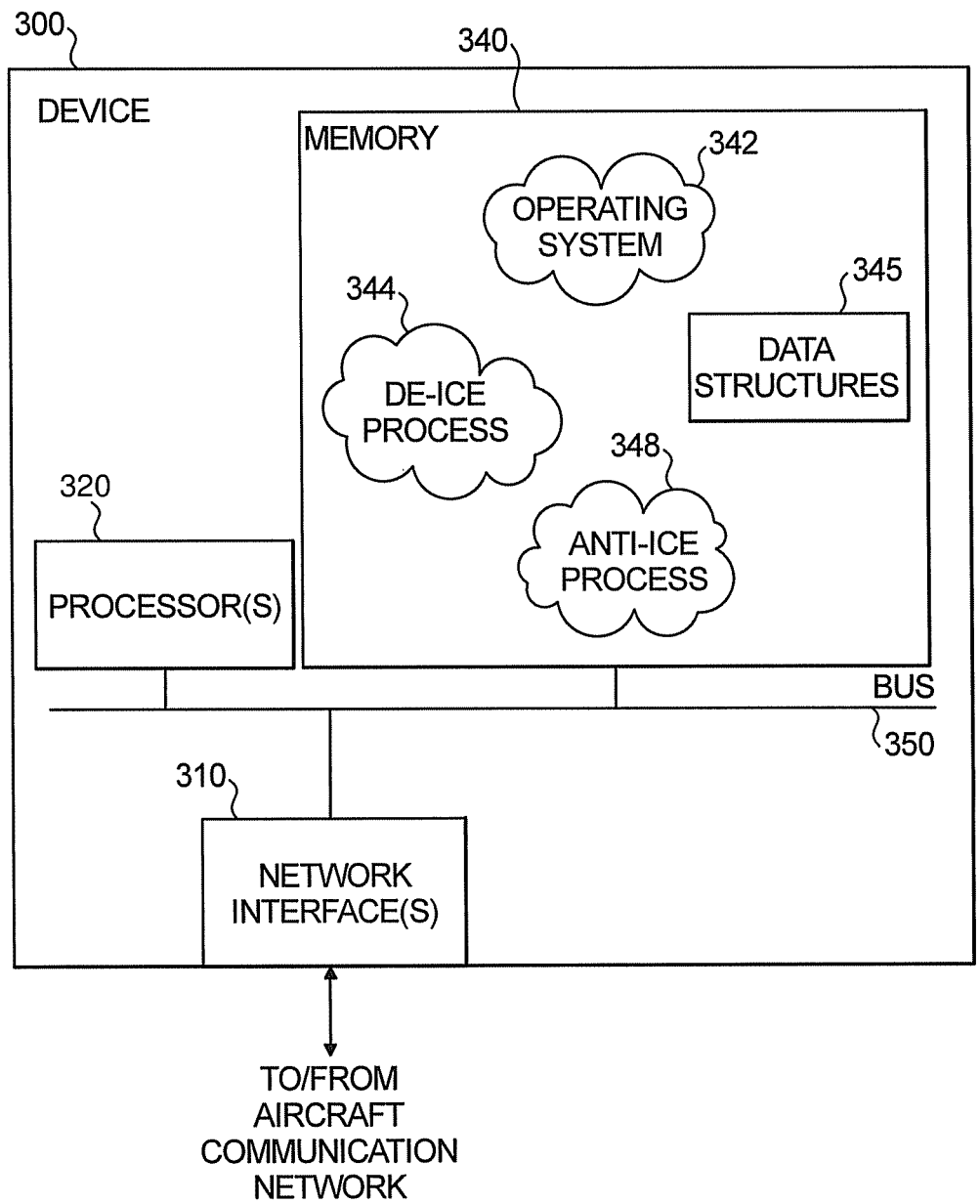
FIG. 3 is a diagram view of an ice protection controller used in an embodiment of the present invention.

With reference now to FIG. 3, an exemplary device/ice protection controller 300 is shown. Ice protection controller 300 may include one or more network interfaces 310, e.g., wired, wireless, etc., at least one processor 320, and a memory 340 interconnected by a system bus 350.

The network interface(s) 310 comprise the mechanical, electrical, and signaling circuitry for communicating data to and from an aircraft communication network, e.g., Common Avionics Architecture System (CAAS). Note that each device 300 may include one or more different types of network connections 310 (e.g., wireless and wired/physical connections) to various other sensors, components, and aircraft systems, and that the view herein is merely for illustration.

Memory 340 comprises a plurality of storage locations that are addressable by the processor 320 and the network interfaces 310 for storing software programs and data structures associated with the embodiments described herein. Processor 320 may comprise hardware elements or hardware logic adapted to execute the software programs and manipulate the data structures 345. Operating systems 342, portions of which are typically resident in memory 340 and executed by the processor, functionally organizes the device by, inter alia, invoking operations in support of software processes and/or services executing on the device. These software processes and/or services may comprise a de-ice process/services 344, and an anti-ice process 348, as described herein. Notably, de-ice process 344 typically corresponds to main rotor blades and anti-ice process 348 corresponds to preventing ice accumulation on tail rotor blades. Further, de-ice process 344 and anti-ice process 348 may comprise computer executable instructions executed by the processor 320 to provide control signals to cause one or more heating elements to perform de-ice or anti-ice functionality, respectively.

Each of the techniques described herein may be performed by hardware, software, and/or firmware, such as in accordance with processes 344, 348, or a combination thereof, which may contain computer executable instructions executed by the processor 320 (or independent processor of interfaces 310). In addition, while processes 344 and 348 are shown as installed in a memory 340, and therefore being implemented in software, these processes could be implemented in any of hardware (e.g., electronic circuitry), firmware, software, or a combination thereof. Alternatively, these processes may be configured on a storage medium for subsequent loading into memory 340. The storage medium can include a computer-readable medium encoded with a computer program, and can be any conventional storage medium that stores the processes thereon in tangible form. Examples of storage media include a floppy disk, a compact disk, a magnetic tape, a read only memory, an optical storage media, universal serial bus (USB) flash drive, etc. Alternatively, storage media can include a random access memory, or other type of electronic storage, located on a remote storage system and coupled to processor 320, via network interface 310. As will be apparent to those skilled in the art other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 4:
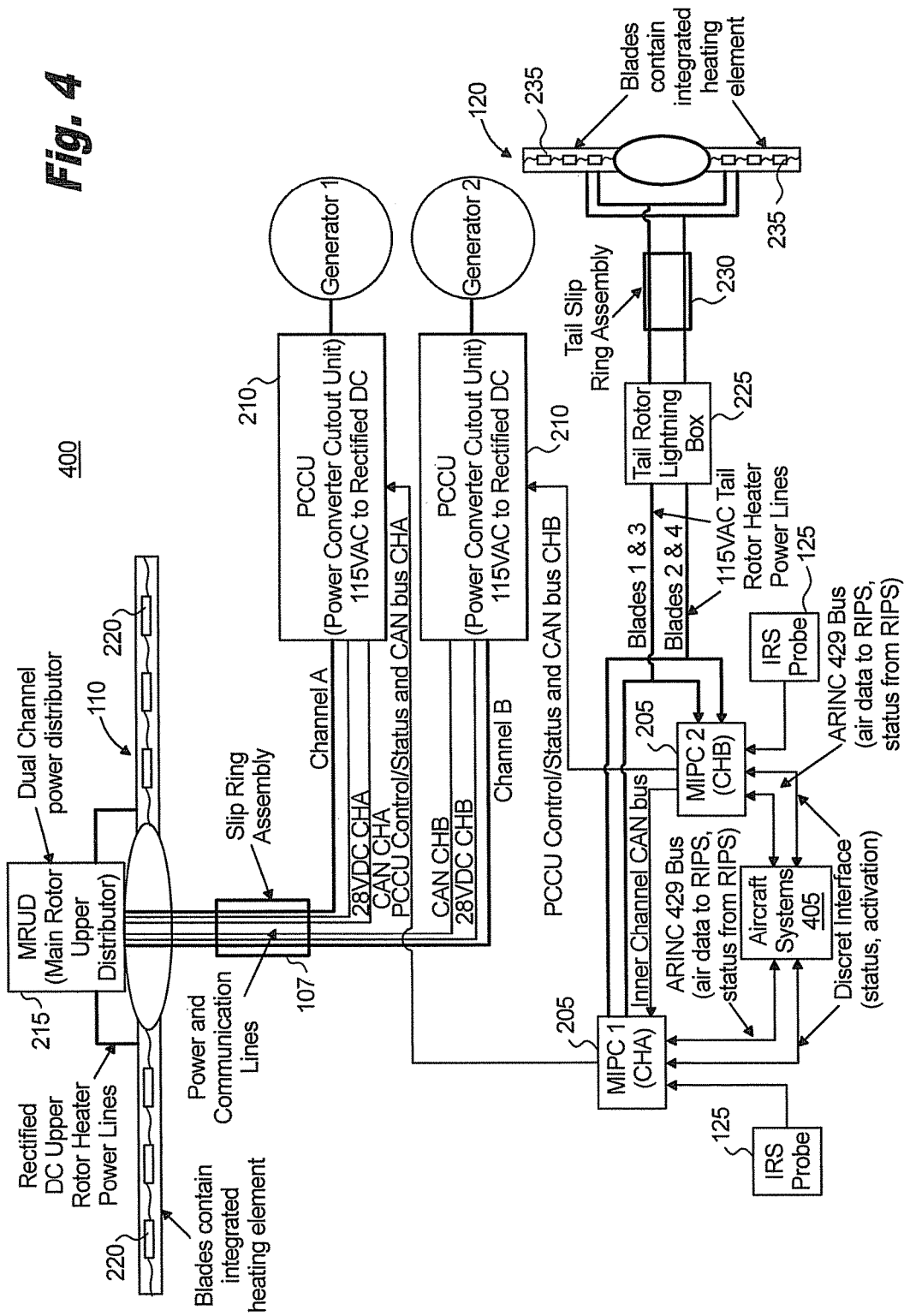
FIG. 4 is a detailed schematic view of the various components of the ice management system of FIG. 3, showing communication busses.
Figure 5:
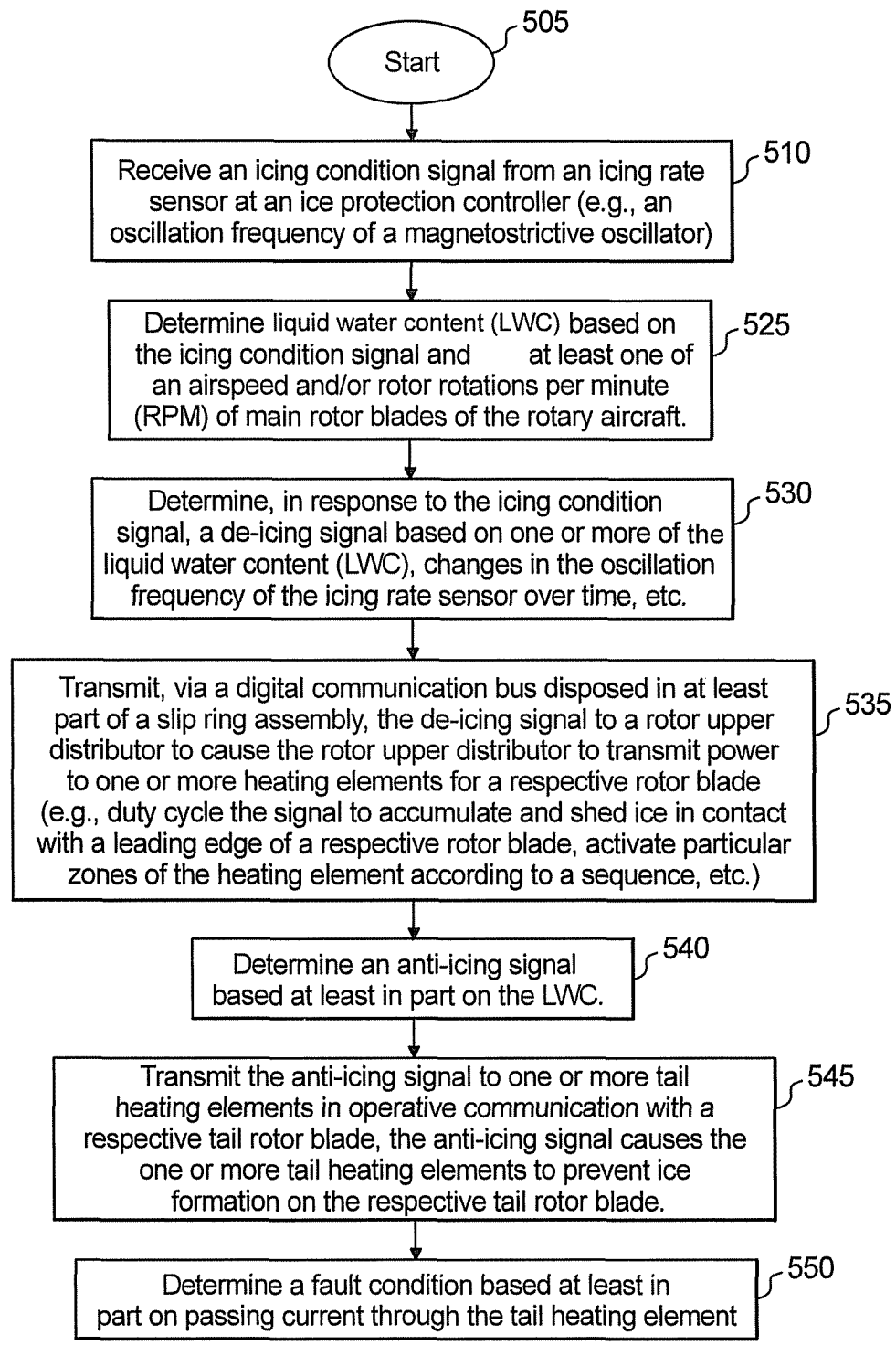
FIG. 5 is a diagram flow chart of a method for anti-icing and de-icing rotor blades.

Referring now to FIG. 4, a detailed schematic view of the various components of the ice management system including one or more communication busses is shown. In particular, FIG. 4 provides a detailed schematic 400 of the various components of ice management system 300 shown with respect to FIG. 3, discussed above.

In particular, each ice protection controller 205 communicates via one channel (e.g., channel A or channel B) to the upper distributor 215. Moreover, these channels can include a digital communication bus such as a "controller area network" (CAN) bus. As illustrated, each ice protection controller 205 can communicate to the upper distributor via the CAN bus, which is routed through a power converter cutout unit 210 and slip ring assembly 107. Communicating signals from a single ice protection controller via a digital communication bus advantageously reduces the overall complexity of the ice protection system and centralizes communication in a single unit.

As shown, each ice protection controller 205 communicates a de-ice signal to the upper distributor 215 and causes the upper distributor to provide rectified DC power to heating elements 220 that are in operative communication with respective rotor blades 110. As discussed above, the heating elements can include heating zones, which can be sequentially activated by the upper distributor 215. In addition, the upper distributor can monitor its own health as well as health of heating elements and by detecting current passing there-through (e.g., short-circuits, open circuits, etc.) Moreover, these health signals can be transmitted via the CAN bus to the ice protection controller 205. These health signals may be analyzed at the upper distributor to generate fault reports, or the health signals can be analyzed at respective ice protection controllers 205. In addition, each ice protection controller 205 can also monitor health and status of respective power converter cutout units 210 via discrete outputs and a fan tachometer pulsed signal from the power converter cutout unit 210. Notably, the fan tachometer signal indicates a fan rotation frequency used to verify that the power converter cutout unit fan is adequately circulating airflow to keep an operating temperature down. Signals that can be monitored by the ice protection controller can include an Overheat Warning signal, a fan tach signal, and a safety power cutout feedback signal. In addition, as discussed above, due to system redundancy, each ice protection controller can also monitor an opposite channel safety power cutout feedback signal that can be used to verify the state of the opposite channel's safety cutouts prior to engaging its own set.

In operation, the rotor ice protection system is initially turned-on via an activation signal in the aircraft cockpit from the aircraft avionics systems 405 to one or both of the ice protection controllers 205 (e.g., channel A and channel B on respective ice protection controllers). Once initialized, each ice protection controller 205 activates or turns-on the various other components of the ice protection system. The ice protection controller associated with channel A is typically a primary source for ice protection signals unless there is a fault detected to cause the ice protection system to use channel B. Notably, discussion herein focuses on the ice protection controller associated with channel A, which equally applies to the ice protection controller associated with channel B, unless otherwise specified.

Once enabled or initialized, the ice protection controllers 205 receive icing conditions signals from respective icing rate sensors 125, monitor changes in the icing condition signal over time, and determine a liquid water content (LWC) of the ambient air of the aircraft. Specifically, each icing rate sensor 125 can include a magnetostrictive sensing element, which typically vibrates without any accretion of ice at about 40 kHz. In operation, ice accretion on the sensing element (e.g., the magnetostrictive sensing element) causes the vibration frequency to decrease. As is understood by those skilled in the art, various types of sensors can be used to detect and generate icing condition signals without departing from the scope and spirit of the invention.

More specifically, each ice protection controller 205 continuously monitors the icing condition signal and compares the icing condition signal against a threshold (typically, a threshold can be set to reflect an oscillation frequency corresponding to 0.015" of ice on the icing rate sensor 125). Once the threshold is reached, the ice protection controller 205 sends a de-icing signal to upper rotor distributor 215 to cause the upper distributor 215 to transmit power to one or more heating elements 220 for a respective rotor blade 110.

In preferable embodiments, the ice protection controller 205 determines the de-icing signal, in response to the icing condition signal, based at least in part on a liquid water content (LWC). Specifically, the icing condition signal can be used to determine an icing rate, which is used, in part, to determine the LWC. With respect to this icing rate, each ice protection controller 205 can determine the icing rate (e.g., how fast ice is accreting on the icing rate sensor 125) via changes in the icing condition signal over time (df/dt) since the icing condition signal can be a frequency modulated signal that dynamically reflects changes in the oscillation frequency of the icing rate sensor 125. The ice protection controller can monitor the icing condition signal over time and determine an icing rate. With respect to the LWC, the icing rate and at least one of an airspeed and/or the rotations per minute (RPM) of the main rotor blades can be used to determine the LWC. That is, an airspeed condition is typically used to determine the LWC based on the airspeed of water droplets impinging on the icing rate sensors, however; when the aircraft is at a hover, the aircraft RPM may be used to determine the LWC since the RPM can serve as a proxy for downwash upon icing rate sensor 125.

As discussed above, ice protection controller 205 can employ a de-ice process 344 and an anti-ice process 348 for the main rotor blades and the tail rotor blades, respectively. With respect to de-ice process 344, the ice protection controller 205 receives an icing signal from the icing rate sensor 125. The ice protection controller 205, in response to the icing condition signal, determines a de-icing schedule based at least in part on the LWC and an outside air temperature (OAT), and transmits the de-icing signal via a digital communication bus (e.g., the CAN bus) via slip ring assembly 107 to upper distributor 215. The de-icing signal causes the upper distributor 215 to transmit power to one or more heating elements of respective rotor blades 110. As discussed above, upper distributor 215 communicates with one or more heating elements 220 for a respective rotor blade, and each main rotor blade heating element can include multiple zones (e.g., typically five or six zones). Typically, a thin layer of ice is allowed to accumulate on the main rotor blades for a particular heating cycle. Once the thin layer of ice has accumulated, the upper distributor 215 applies power in a sequence to various heating zones of a heating element for a short duration of time. This sequence causes ice in contact with respective leading edge zones to melt and shed. The sequence then repeats once the thin layer of ice accumulates. This heating cycle repeats until the aircraft has safely exited icing conditions.

According to one exemplary embodiment, each main rotor heating element can include multiple heating zones (e.g., 5 zones, 6 zones, etc.). Accordingly, only one heating zone per blade is energized at any given time. During a de-ice cycle, the ice protection controller commands the rotor upper distributor to activate each particular heater zone in a sequence. The exact amount of time spent heating each zone is determined by a heating algorithm applied for a particular application and can be based on the outside air temperature (OAT), liquid water content (LWC), and/or main rotor rotations per minute (RPM). After a last zone of the heating element is activated, the ice management system waits for a determined period of time based on the icing conditions (e.g., OAT, LWC, RPM, etc.). The wait period is also known as dwell time. For example, this sequence is highlighted by table 1, below:

TABLE 1

| | | An Example De-Icing Sequence for a Main Rotor Blade | | | | | | |
|---|---|---|---|---|---|---|---|---|
| Zone | T0 | T1 START | T2 | T3 | T4 | T5 | T6 | T7 DWELL | T8 |
| 1 | | ON | | | | | | | ON |
| 2 | | | ON | | | | | | |
| 3 | | | | ON | | | | | |
| 4 | | | | | ON | | | | |
| 5 | | | | | | ON | | | |
| 6 | | | | | | | ON | | |

The dwell time is a total de-icing cycle period minus a sum of each of the zone "ON" times. In more severe icing conditions, the dwell time will reduce and may even disappear and give way to constant blade heater activation. Preferably, a same heater zone is activated simultaneously for each of the main rotor blades to maintain symmetrical ice shedding from blade to blade in order to reduce aircraft vibrations and handling effects.

With respect to anti-ice process 348, the ice protection controller 205 determines an anti-icing signal based at least in part on the LWC and the OAT (which was determined for the de-ice process 344), and transmits the anti-icing signal to one or more tail heating elements that are in operative communication with respective tail rotor blades. The anti-icing signal causes the tail heating elements to heat up thereby preventing ice formation on each respective tail rotor blade. In this fashion, the anti-ice process 348 maintains an ice free surface on the tail rotor blades by keeping the surface above a minimum temperature at which ice cannot form. Importantly, the anti-ice process 348 uses the determined LWC and the OAT of the de-ice process 344 as a proxy for conditions that exist at the tail rotor. In this fashion, the anti-ice algorithm can be considered an open-loop anti-ice algorithm since it does not use active feedback from any temperature sensors. The ice protection controller 205, using the determined LWC and the OAT determines the anti-ice signal, which includes a pulse width modulated duty cycle required to maintain anti-ice operation of the tail heating elements 235. In particular, the ice protection controller receives 3-phase AC power from an AC power generator and transmits an anti-icing signal or a heating power signal to the tail heating elements 235 via a tail rotor lightning box 225 and tail slip ring 230. Tail rotor lightning box 225 is a passive unit that resides in the tail of the helicopter and located close to the tail slip ring 230 to limit the energy from lightning strikes to the tail from propagating to other electronics. In addition, similar to the fault detection of the de-ice process 244, ice protection controller 205 monitors the current through tail heating elements 235 for fault conditions and reports overall system health and status to aircraft avionics systems 405 via digital communications data busses. As discussed above, signals on channel B ice protection controllers serve as backup to channel A ice protection signals in the case of a Channel A system failure.

In one exemplary embodiment, each tail rotor blade is anti-iced. Accordingly, heating elements for associated tail rotor blades typically includes a single zone. In addition, for tail rotors having 4 blades, each zone may cover two opposing blades such that if a zone is lost mechanical balance can still be maintained across the rotor hub. The heating element also applies heat to an entire tail rotor blade at once, as opposed to a single portion or zone discussed with respect to de-icing main rotor blades. In addition, the heating element can apply heat to two opposing blades at the same time or all blades on the tail rotor at the same time depending on an aircraft power budget and a capacity to apply heat to all blades at the same time. According to the present invention, main rotor conditions serve as a proxy for icing conditions on the tail rotor to create a projected tail ice condition. In this fashion, a duty cycle is applied to tail heating elements associated with respective tail rotor blades based on the OAT and the LWC. The tail anti-ice algorithm attempts to characterize the aircraft icing conditions in order to apply heat to the tail rotor blades and maintain a set temperature that is favorable for keeping the blades free from ice and to evaporate impinging water droplets thereby avoiding droplet runback and refreeze aft of the tail rotor blade heaters. According to this exemplary embodiment, tail heating elements are operated in a set period with a variable duty cycle to vary the average power delivered to the heaters.

For example, Table 2, below, illustrates time periods for anti-icing tail rotor blades according to a 20% duty cycle with each tail rotor blade being simultaneously heated.

water content (LWC) based on the icing condition signal (e.g., the icing rate) and at least one of an airspeed and/or rotor rotations per minute (RPM) of the main rotor blades. As discussed above, the airspeed and/or RPM can be used depending on if the aircraft is in a forward flight or if the aircraft is in a hover, respectively. The icing protection controller, in step 530, in response to the icing condition signal, determines a de-icing signal, which can be based on the determined LWC. Further, in step 535, the ice protection controller can transmit, via a digital communication bus (e.g., the CAN bus) disposed in at least part of a slip ring assembly (e.g., slip ring 107), the de-icing signal to an upper distributor. The upper distributor, in response to the de-icing signal transmits power to one or more heating elements for a respective rotor blade. As discussed above, power can be

TABLE 2

Tail Rotor Blade Anti-Icing With 20% Duty Cycle

| Tail Blade | Heating Period | | | | | Heating Period | | | | | Heating Period | | | | | Heating Period | | | | |
|---|---|---|---|---|---|---|---|---|---|---|---|---|---|---|---|---|---|---|---|---|
| | T0 | T1 | T2 | T3 | T4 | T5 | T6 | T7 | T8 | T9 | T10 | T11 | T12 | T13 | T14 | T15 | T16 | T17 | T18 | T19 | T20 |
| 1 | ON | | | | | ON | | | | | ON | | | | | ON | | | | | |
| 2 | ON | | | | | ON | | | | | ON | | | | | ON | | | | | |
| 3 | ON | | | | | ON | | | | | ON | | | | | ON | | | | | |
| 4 | ON | | | | | ON | | | | | ON | | | | | ON | | | | | |

As discussed above, tail rotor blades can also be heated in opposite pairs. For example, Table 3, below, shows time periods for anti-icing opposite pairs of tail rotor blades according to a 40% duty cycle.

duty cycled to heating elements on a leading edge of the rotor blade to allow iterative ice accumulation and ice shed and/or particular zones of the heating element can be sequentially activated/powered. Next, in step 540, the ice

TABLE 3

An Example Tail Rotor Blade Anti-Icing With 40% Duty Cycle - Blades Heated In Opposing Pairs

| Tail Rotor Blade | Heating Period | | | | | Heating Period | | | | |
|---|---|---|---|---|---|---|---|---|---|---|
| | T0 | T1 | T2 | T3 | T4 | T5 | T6 | T7 | T8 | T9 | T10 |
| 1 | | ON | ON | | | | ON | ON | | | |
| 2 | | | | ON | ON | | | | ON | ON | |
| 3 | | ON | ON | | | | ON | ON | | | |
| 4 | | | | ON | ON | | | | ON | ON | |

| Tail Rotor Blade | Heating Period | | | | | Heating Period | | | | |
|---|---|---|---|---|---|---|---|---|---|---|
| | T11 | T12 | T13 | T14 | T15 | T16 | T17 | T18 | T19 | T20 |
| 1 | ON | ON | | | | ON | ON | | | |
| 2 | | | ON | ON | | | | ON | ON | |
| 3 | ON | ON | | | | ON | ON | | | |
| 4 | | | ON | ON | | | | ON | ON | |

As a specific example of the techniques described above, FIG. 5 illustrates an example implementation of the techniques herein for both de-ice process 344 and an anti-ice process 348, particularly from the perspective of the ice protection controller (e.g., ice protection controller 205). The procedure 500 begins at step 505, and continues to step 510, where, as described in greater detail above, the ice protection controller receives an icing condition signal from an icing rate sensor. As discussed above, the icing signal can be a frequency modulated signal that dynamically reflects an oscillation frequency of the icing rate sensor. Further, the ice protection controller can monitor changes in the icing signal over time (df/dt) to determine an icing rate. Next, in step 525, the ice protection controller can determine a liquid protection controller can determine an anti-icing signal (e.g. perform anti-ice process 348). The anti-icing signal can be determined via an open loop system that uses main rotor conditions as a proxy for tail rotor ice accumulation. In particular, the open loop does not use active feedback from any temperature sensors. In this fashion, the ice protection controller, using the LWC determined for the main rotor blades can determine the anti-ice signal, which includes a pulse width modulated duty cycle required to maintain anti-ice operation of the tail heating elements. Further, as discussed above, the anti-ice signal can account for the outside air temperature (OAT) for powering particular zones and/or cycling power to tail heating elements. Next, in step 545, the ice protection controller transmits the anti-icing signal to one or more tail heating elements in operative communication with a respective tail rotor blade. In response, the tail heating elements heat up to prevent ice formation. Next, in step 550, the ice protection controller can determine fault conditions based on current passing through the main heating elements or the tail heating elements. The procedure 500 may subsequently end in step 550, or, may return to step 505 to receive an icing condition signal.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedure 500 includes both steps for a de-icing process 344 and an anti-icing process 348, certain steps from each process may be incorporated into each other procedure, and the processes are not meant to be mutually exclusive.

The techniques and systems described herein and shown in the drawings, provide for ice protection systems and methods employing an efficient yet simple design that includes communication of de-icing and anti-icing signals to various components via a digital bus. Further, the techniques and systems provide anti-icing capability without a need for additional line replaceable units (LRUs) to be deployed near the tail rotor since conditions determined for de-icing the main rotor serve as a proxy. While techniques described herein have been shown and described with reference to preferred embodiments and provide for one aircraft configuration that achieve these ends, alternative changes and/or modifications of these configurations will be readily appreciated by those skilled in the art without departing from the spirit and scope of the subject invention.

What is claimed is:

1. A rotor ice protection system for a rotary aircraft having one or more heating elements associated with a respective rotor blade, the system comprising:
    at least one ice protection controller that receives an icing condition signal and, in response, generates a de-icing signal;
    one or more icing rate sensors in communication with the ice protection controller, each icing rate sensor detects an icing condition and, in response to the detected icing condition, generates the icing condition signal, wherein each icing rate sensor transmits the icing condition signal to respective ice protection controllers; and
    an upper distributor in communication with the ice protection controller and configured to receive the de-icing signal from the ice protection controller and in response, transmits power to the one or more heating element to de-ice the respective rotor blade,
    wherein the upper distributor is in communication with a first ice protection controller through a first digital communication bus disposed in part in a slip ring assembly,
    wherein the upper distributor is in communication with a second ice protection controller through a second digital communication bus disposed in part in the slip ring assembly,
    wherein the upper distributor is electrically connected to a first power source through a first power line disposed in part in the slip ring assembly, and
    wherein the upper distributor is electrically connected to a second power source through a second power line disposed in part in the slip ring assembly.

2. The system of claim 1, wherein the icing rate sensor comprises a magnetostrictive oscillator that detects the icing condition via an oscillation frequency.

3. The system of claim 2, the icing condition signal is a frequency modulated signal that dynamically reflects the oscillation frequency over time, wherein the ice protection controller generates the de-icing signal in response to the changes in the oscillation frequency over time.

4. The system of claim 1, wherein the ice protection controller generates the de-icing signal by determining a liquid water content (LWC) based on a change in frequency of the icing condition signal over time and at least one of and airspeed and rotor rotations per minute (RPM) of main rotor blades.

5. The system of claim 1, wherein the upper distributor transmits power according to a duty cycle that causes the one or more heating elements to de-ice each respective rotor blade by iteratively accumulating and melting ice in contact with a leading edge of the respective rotor blade.

6. The system as recited in claim 4, wherein the rotary aircraft includes one or more tail heating elements associated with a respective tail rotor blade, wherein the ice protection controller transmits power to the one or more tail heating elements based on the LWC to cause the one or more heating elements to prevent ice formation on each respective tail rotor blade.

7. A rotor ice protection system for a rotary aircraft, comprising:
    an icing rate sensor configured to detect an icing condition and generate an icing condition signal in response to the detected icing condition;
    a first protection controller connected to the icing rate sensor and configured to generate a first de-icing signal in response to the icing condition signal;
    a second protection controller connected to the icing rate sensor and configured to generate a second de-icing signal in response to the icing condition signal;
    a first controller area network bus disposed in part in a slip ring assembly and connecting the first ice protection controller to a processor of an upper distributor;
    a second controller area network bus disposed in part in the slip ring assembly and connecting the second ice protection controller to the processor of the upper distributor;
    a first power line disposed in part in the slip ring assembly and connecting the upper distributor to a first power source; and
    a second power line disposed in part in the slip ring assembly and connecting the upper distributor to a second power source,
    wherein the processor of the upper distributor receives the first and second de-icing signals from the first and second ice protection controllers through the first and second controller area network buses, and in response thereto, transmits power from the first power line or the second power line to one or more heating elements for a respective rotor blade.

* * * * *